US009641257B2

United States Patent
Sugihara et al.

(10) Patent No.: US 9,641,257 B2
(45) Date of Patent: May 2, 2017

(54) OPTICAL TRANSMITTER AND DC BIAS CONTROL METHOD

(75) Inventors: Takashi Sugihara, Tokyo (JP); Tsuyoshi Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/422,493

(22) PCT Filed: Sep. 12, 2012

(86) PCT No.: PCT/JP2012/073299
§ 371 (c)(1),
(2), (4) Date: Feb. 19, 2015

(87) PCT Pub. No.: WO2014/041629
PCT Pub. Date: Mar. 20, 2014

(65) Prior Publication Data
US 2015/0236792 A1     Aug. 20, 2015

(51) Int. Cl.
H04B 10/564     (2013.01)
H04B 10/516     (2013.01)

(52) U.S. Cl.
CPC ......... *H04B 10/564* (2013.01); *H04B 10/516* (2013.01)

(58) Field of Classification Search
None
See application file for complete search history.

(56) References Cited

U.S. PATENT DOCUMENTS

| 8,463,138 B2 | 6/2013 | Sugihara et al. |
| 8,718,487 B2 | 5/2014 | Sugihara et al. |

(Continued)

FOREIGN PATENT DOCUMENTS

| JP | 2007 288591 | 11/2007 |
| JP | 2011 232553 | 11/2011 |
| WO | 2010 082578 | 7/2010 |

(Continued)

OTHER PUBLICATIONS

Cho, P. S., et al., "Closed-Loop Bias Control of Optical Quadrature Modulator", IEEE Photonics Technology Letters, vol. 18, No. 21, pp. 2209-2211(Nov. 1, 2006).

(Continued)

*Primary Examiner* — Darren E Wolf
(74) *Attorney, Agent, or Firm* — Oblon, McClelland, Maier & Neustadt, L.L.P.

(57) ABSTRACT

An optical transmitter for modulating light from a light source to generate an optical transmission signal with use of a data sequence as an electric signal, the optical transmitter including: a mapping section for mapping the data sequence to be converted into multi-level data based on modulation multi-level degree information indicating multi-level degree of the modulation; a D/A converter for converting the multi-level data output from the mapping section into an analog signal; an optical modulator to be driven based on the analog signal output from the D/A converter, for modulating the light from the light source; and a bias control section for setting control polarity of DC bias control of the optical modulator based on the modulation multi-level degree information.

6 Claims, 5 Drawing Sheets

(56) References Cited

U.S. PATENT DOCUMENTS

2011/0255876 A1* 10/2011 Sugihara ............ H04B 10/5053
398/188
2012/0288284 A1    11/2012 Yoshida et al.

FOREIGN PATENT DOCUMENTS

WO     2011 030763     3/2011
WO     2011 104838     9/2011

OTHER PUBLICATIONS

Kawakami, H., et at, "Auto bias control technique for optical 16-QAM transmitter with asymmetric bias dithering", Optics Express, vol. 19, No. 26, pp. B308-B312, (Dec. 12, 2011).

Takara, H., et al., "Experimental Demonstration of 400 Gb/s Multi-flow, Multi-rate, Multi-reach Optical Transmitter for Efficient Elastic Spectral Routing", ECOC Technical Digest, Tu.5.A.4, pp. 1-3, (2011).

Sugihara, T., et al., "Electronic Pre-equalization Technologies using High-Speed DAC", ECOC Technical Digest, Tu.6.B.2, pp. 1-3, (2011).

Yoshida, T., et al., "A Study on Automatic Bias Control for Arbitrary Optical Signal Generation by Dual-parallel Mach-Zehnder Modulator", ECOC, Tu.3.A.6, Total 3 Pages, (Sep. 19-23, 2010).

Kametani, S., et al., "16-QAM modulation by Polar Coordinate Transformation with a Single Dual Drive Mach-Zehnder Modulator", OSA/OFC/NFOEC, OWG6.pfd, Total 3 Pages, (2009).

International Search Report Issued Oct. 16, 2012 in PCT/JP12/073299 Filed Sep. 12, 2012.

* cited by examiner

OPTICAL TRANSMITTER AND DC BIAS CONTROL METHOD

TECHNICAL FIELD

The present invention relates to an optical transmitter and a DC bias control method, and more particularly, to an optical transmitter and a DC bias control method for stably generating a plurality of multi-level modulated optical signals.

BACKGROUND ART

Multi-level modulation has been actively applied to an optical communication system in view of enhancement in capacity and improvement in frequency use efficiency. So as to realize a more flexible system configuration, there is disclosed a transmission method involving changing a modulation scheme (transmission rate or transmission bandwidth) in an adaptive manner with use of multi-level modulation (see, for example, Non Patent Literature 1). In Non Patent Literature 1, each Mach-Zehnder (MZ) modulator is driven by binary signals. Thus, a normal binary modulation scheme can be used for bias control of each MZ modulator. In this case, however, the number of modulators needs to be increased as the multi-level degree increases. As a result, there is a problem in that the configuration of the optical transmitter is complicated.

Further, so as to enhance transmission performance, there is known a method involving performing the inverse arithmetic process of a transmission channel transfer function by using digital signal processing on the transmitter side and generating an optical signal with use of an analog waveform obtained through a high speed D/A converter (see, for example, Non Patent Literature 2). In Non Patent Literature 2, an optical waveform is generated based on an analog signal obtained by a D/A converter. In this method, a signal peak-to-average power ratio (PAPR) varies depending on transmission conditions, and it is therefore necessary to appropriately manage a DC bias adjustment in driving of a MZ modulator. As a bias control method for a modulator driven with an arbitrary analog waveform, a control method using a dither signal has hitherto been proposed (see, for example, Patent Literature 1 and Patent Literature 2). Further, it is known that the bias control has such characteristics that the polarity thereof changes due to a difference of an average drive amplitude caused by PAPR variations. To avoid this, there is disclosed a technology of controlling the drive amplitude in accordance with the PAPR to perform stable bias control (see, for example, Patent Literature 1 and Non Patent Literature 3).

In the case of supporting a plurality of multi-level modulation schemes, a multi-level signal generation technology using D/A conversion is known as a method for achieving a simpler transmitter configuration by suppressing an increase in number of MZ modulators caused by an increase in multi-level degree (see, for example, Patent Literature 3 and Non Patent Literature 4). Mapping of transmission data to a multi-level signal can be easily realized by multi-level modulation with use of a lookup table described in Patent Literature 4, for example.

CITATION LIST

Patent Literature

[PTL 1] WO 2011-104838 A1
[PTL 2] JP 2011-232553 A
[PTL 3] JP 2007-288591 A
[PTL 4] WO 2010-082578 A1

Non Patent Literature

[NPL 1] H. Takara, et al., "Experimental demonstration of 400 Gb/s Multi-flow, Multi-rate, Multi-reach optical transmitter for efficient elastic spectral routing," ECOC2011, Tu.5.A.4, 2011.
[NPL 2] T. Sugihara, et al., "Electronic pre-equalization technologies using high-speed DAC," ECOC2011, Tu.6.B.2, 2011.
[NPL 3] T. Yoshida, et al., "A study on automatic bias control for arbitrary optical signal generation by dual-parallel mach-zehender modulator," ECOC2010, Tu.3.A.6, 2010.
[NPL 4] S. Kametani, et al., "16-QAM modulation by polar coordinate transformation with a single dual drive mach-zehnder modulator," OFC/NFOEC2009, OWG6, 2009.

SUMMARY OF INVENTION

Technical Problems

The related art, however, has the following several problems.

The multi-level modulation method involving driving the MZ modulator with an output of the D/A converter may simplify the configuration of the optical transmitter. However, when the multi-level degree of modulation changes, the PAPR of a driving electric signal changes. Thus, it is difficult to stabilize the DC bias of the MZ modulator regardless of the multi-level degree of modulation, and it is difficult to support a plurality of modulation schemes.

Further, in order to achieve the same DC bias control regardless of the multi-level degree of modulation, it is necessary to suppress the drive signal amplitude to low level. In this case, however, a signal-to-noise ratio of the electric signal deteriorates to deteriorate the signal quality.

In addition, no report has been found so far on a DC bias control method suitable for driving a MZ modulator with an output of a D/A converter and supporting a plurality of multi-level modulation schemes.

The present invention has been made in order to solve the problems as described above, and it is an object thereof to provide an optical transmitter and a DC bias control method that are capable of stably realizing a plurality of multi-level modulation schemes with a simple modulator configuration.

Solution to Problems

According to one embodiment of the present invention, there is provided an optical transmitter for modulating light from a light source to generate an optical transmission signal with use of a data sequence as an electric signal, the optical transmitter including: a mapping section for mapping the data sequence to be converted into multi-level data based on modulation multi-level degree information indicating multi-level degree of the modulation; a D/A converter for converting the multi-level data output from the mapping section into an analog signal; an optical modulator to be driven based on the analog signal output from the D/A converter, for modulating the light from the light source; and a bias control section for setting control polarity of DC bias control of the optical modulator based on the modulation multi-level degree information.

Advantageous Effects of Invention

According to one embodiment of the present invention, the optical transmitter for modulating the light from the light source to generate the optical transmission signal with use of the data sequence as the electric signal includes: the mapping section for mapping the data sequence to be converted into the multi-level data based on the modulation multi-level degree information indicating the multi-level degree of the modulation; the D/A converter for converting the multi-level data output from the mapping section into the analog signal; the optical modulator to be driven based on the analog signal output from the D/A converter, for modulating the light from the light source; and the bias control section for setting the control polarity of the DC bias control of the optical modulator based on the modulation multi-level degree information. Thus, the plurality of multi-level modulation schemes can be stably realized with the simple modulator configuration.

DESCRIPTION OF EMBODIMENTS

Each embodiment of the present invention is now described with reference to the drawings. The same or corresponding parts in the drawings are denoted by the same reference numerals for description. Note that, the embodiment is merely illustrative, and the present invention is not intended to be limited by the embodiment.

First Embodiment

Figure 1:
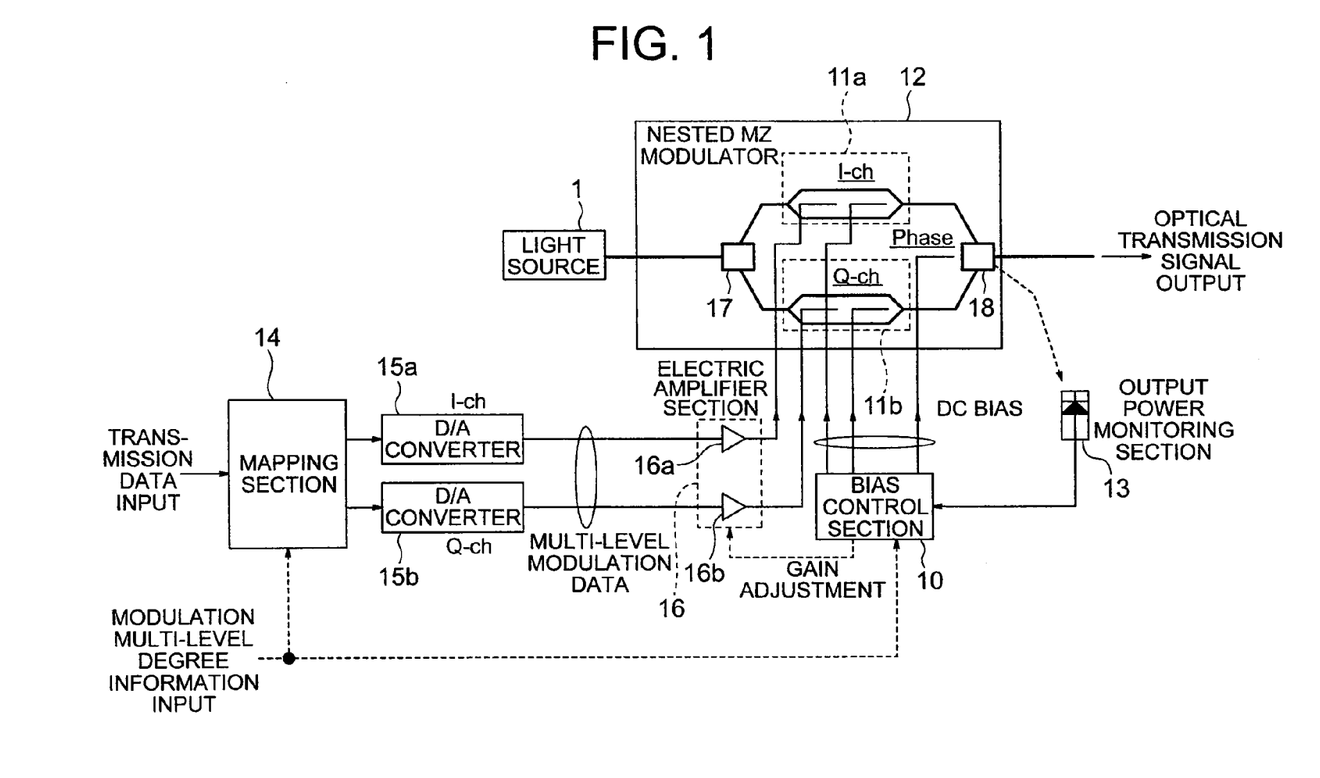
FIG. 1 is a configuration diagram illustrating an optical transmitter according to a first embodiment of the present invention.

FIG. 1 is a configuration diagram illustrating an optical transmitter according to a first embodiment of the present invention. The optical transmitter uses a data sequence (binary data) as an electric signal to modulate light from a light source with an optical modulator, to thereby generate an optical transmission signal having an arbitrary optical waveform.

In FIG. 1, the optical transmitter includes a light source 1, a bias control section 10, a nested MZ modulator 12 (optical modulator), an output power monitoring section 13, a mapping section 14, D/A converters 15a and 15b, and an electric amplifier section 16. Further, the electric amplifier section 16 includes two electric amplifiers 16a and 16b.

The nested MZ modulator 12 includes two Mach-Zehnder modulators (hereinafter referred to as "MZ modulators") 11a and 11b, an optical branch section 17, and an optical multiplexer section 18.

In this embodiment, a dual-parallel Mach-Zehnder modulator (DP-MZM) in which two Mach-Zehnder modulators (hereinafter referred to as "MZ modulators") 11a and 11b are connected in parallel is exemplified as the nested MZ modulator 12. Herein, the MZ modulator 11a is a MZ modulator for a real part (in-phase channel (I-ch)), and the MZ modulator 11b is a MZ modulator for an imaginary part (quadrature-phase channel (Q-ch)). In the DP-MZM, respective modulated signals output from the MZ modulators 11a and 11b are multiplexed with each other with a relative optical phase difference, to thereby generate a multi-level signal such as a quadrature amplitude modulation (QAM) signal, and the generated multi-level signal is output as an optical transmission signal.

The functions of the respective sections of the optical transmitter according to this embodiment are now described.

The light source 1 outputs light to be input to the nested MZ modulator 12.

In the nested MZ modulator 12, the optical branch section 17 branches the light input from the light source 1 into two light beams. The light beams output from the optical branch section 17 are input to the MZ modulators 11a and 11b, respectively.

Signals output from the D/A converters 15a and 15b, which are determined based on modulation multi-level degree information, are input to the MZ modulators 11a and 11b via the electric amplifiers 16a and 16b as multi-level drive signals. The MZ modulators 11a and 11b are driven based on the multi-level drive signals.

Figure 3:
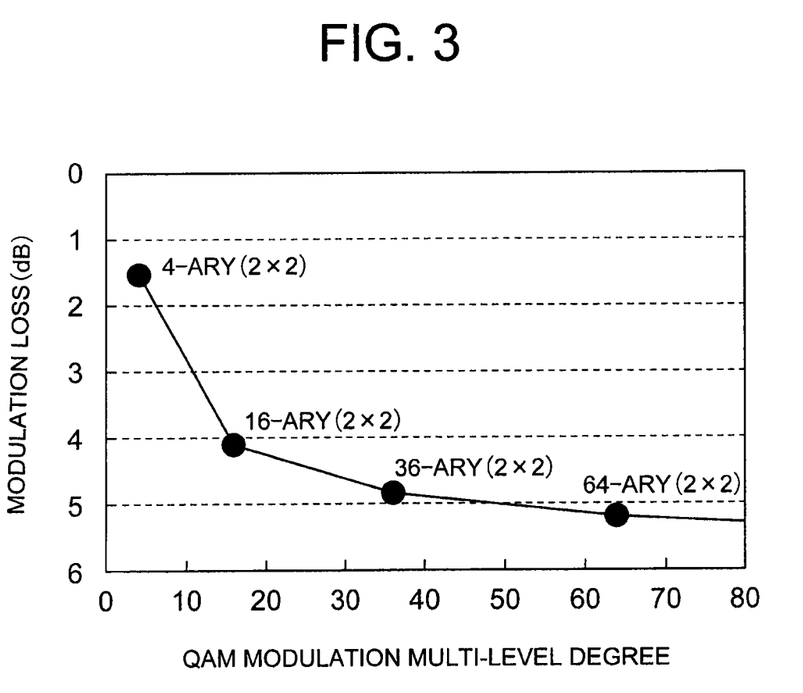
FIG. 3 is a graph showing a relationship between a multi-level degree and a modulation loss in an optical modulator according to the first embodiment of the present invention.

Note that, the modulation multi-level degree information is information indicating the multi-level degree of modulation. Specifically, taking QAM modulation as an example, the kinds of the multi-level degree of modulation include 4-ary (QPSK), 16-ary (16QAM), 36-ary (36QAM), and 64-ary (64QAM) as shown in FIG. 3. Thus, the modulation multi-level degree information indicates which one of the kinds the multi-level degree of modulation is.

Further, as illustrated in FIG. 1, the nested MZ modulator 12 receives three bias signals (namely, I-ch control voltage, Q-ch control voltage, and phase control voltage) from the bias control section 10. The I-ch control voltage and the Q-ch control voltage are bias signals which are used by the MZ modulators 11a and 11b so as to generate an I-ch optical electric field and a Q-ch optical electric field that are orthogonal to each other. Further, the phase control voltage is a bias signal which is used so as to apply a relative optical phase difference between I-ch and Q-ch to the modulated signals output from the MZ modulators 11a and 11b.

The MZ modulators 11a and 11b perform data modulation on the respective light beams output from the optical branch section 17 based on the multi-level drive signals output from the electric amplifiers 16a and 16b. Further, the MZ modulators 11a and 11b perform phase modulation on the respective data-modulated light beams based on the I-ch control voltage and the Q-ch control voltage output from the bias control section 10. A relative optical phase difference based on the phase control voltage is given to the optical signals modulated by the MZ modulators 11a and 11b, and the resultant signals are multiplexed with each other by the optical multiplexer section 18. The multiplexed optical signal is output to the outside as an optical transmission signal.

The output power monitoring section 13 detects output power of the optical transmission signal output from the nested MZ modulator 12. The output power monitoring section 13 outputs an electric signal corresponding to the intensity of light multiplexed by the optical multiplexer section 18 as a detection signal. The detection signal is input to the bias control section 10.

As the output power monitoring section 13, a low speed photodetector (PD) for monitoring output scattered light of the nested MZ modulator 12 may be used. Alternatively, the optical branch section 18 may be formed of an optical coupler or the like, and the output power monitoring section 13 may be formed of a low speed PD. In this case, an optical signal itself output from the nested MZ modulator 12 is tapped with use of the optical branch section 18 (optical coupler), and the tapped optical signal is received by the output power monitoring section 13 (low speed PD). In an actual case, an amplifier such as a trans-impedance amplifier (TIA) is provided downstream of the PD, and after an optical signal is converted by the PD into a current, the current is converted by the amplifier into an electric signal level or an electric signal bandwidth suitable for control. Such amplifier is, however, not illustrated in FIG. 1.

The mapping section 14 receives a data sequence constructed by binary data, and receives the modulation multi-level degree information as well. Based on the modulation multi-level degree information, the mapping section 14 maps the binary data to convert them into multi-level data. Specifically, when the modulation multi-level degree information is 4-ary, the mapping section 14 converts the binary data into 4-ary data. When the modulation multi-level degree information is 16-ary, the mapping section 14 converts the binary data into 16-ary data. The mapping section 14 performs the mapping with use of a lookup table described in Non Patent Literature 4 and Patent Literature 4, for example. Further, in the case where the multi-level degree is adaptively changed by the mapping section 14, the setting of the lookup table is appropriately changed. The mapping section 14 outputs an I-ch component and a Q-ch component of the generated multi-level data to the D/A converter 15a and the D/A converter 15b, respectively.

The D/A converter 15a converts a data signal of the I-ch component into an analog signal, and outputs the converted analog signal to the electric amplifier section 16a.

The D/A converter 15b converts a data signal of the Q-ch component into an analog signal, and outputs the converted analog signal to the electric amplifier section 16b.

The electric amplifier 16a amplifies the analog signal input from the D/A converter 15a up to a voltage amplitude level necessary for driving the MZ modulator 11a.

The electric amplifier 16b amplifies the analog signal input from the D/A converter 15b up to a voltage amplitude level necessary for driving the MZ modulator 11b.

The analog signals thus generated by the D/A converters 15a and 15b are input to the MZ modulators 11a and 11b via the electric amplifiers 16a and 16b to be used as multi-level drive signals for driving the MZ modulators 11a and 11b, respectively.

The bias control section 10 adjusts the I-ch control voltage and the Q-ch control voltage used for setting the DC biases of the MZ modulators 11a and 11b and the phase control voltage used for setting the relative optical phase difference between I-ch and Q-ch. Through the adjustment, the bias control section 10 controls the DC biases of the MZ modulators 11a and 11b to a Null point, and controls the setting of the relative optical phase difference to approximately $\pi/2$. In this case, the operation of setting the relative optical phase difference between I-ch and Q-ch to $\pi/2$ corresponds to the operation of producing the I-ch optical electric field and the Q-ch optical electric field so as to be orthogonal to each other. The bias control section 10 performs the bias control based on the detection signal from the output power monitoring section 13. The bias control section 10 is constructed by a microcomputer and a device such as a field programmable gate array (FPGA), and can be realized by a digital control program.

Since the detection signal output from the output power monitoring section 13 is an analog signal, when digital signal processing is performed in the bias control section 10, an A/D converter is used therein for converting the analog signal into a digital signal. However, the illustration of the A/D converter is omitted in FIG. 1. The bias control in the nested MZ modulator can be realized by performing low speed dither signal superimposition, coherent detection, and error signal calculation with use of the method described in Non Patent Literature 3, Patent Literature 1, Patent Literature 2, and the like.

In FIG. 1, when multi-level QAM modulation is performed by the nested MZ modulator 12, multi-level drive signals for driving the MZ modulators 11a and 11b need to have a value of 2-ary or higher. For example, in the case of 16QAM, the MZ modulators 11a and 11b each need to be driven with 4-ary. In this embodiment, the D/A converters 15a and 15b are used to generate the respective multi-level drive signals. In order to convert transmission data (binary data) into the multi-level drive signals for the respective MZ modulators 11a and 11b, the mapping section 14 uses the lookup table or the like to convert the input binary data into multi-level data. Next, the D/A converters 15a and 15b each convert the multi-level data into an analog signal. The outputs from the D/A converters 15a and 15b are amplified by the electric amplifiers 16a and 16b up to a voltage amplitude level necessary for driving the MZ modulators 11a and 11b so as to be output as the multi-level drive signals. In this case, the bias control section 10 sets the amplification factors of the electric amplifiers 16a and 16b so that a peak-to-peak value of the multi-level drive signals may be approximately $2V\pi$ ($V\pi$ is a half-wavelength voltage of the MZ modulators 11a and 11b). The details thereof are described below with reference to FIG. 5.

Figure 5:
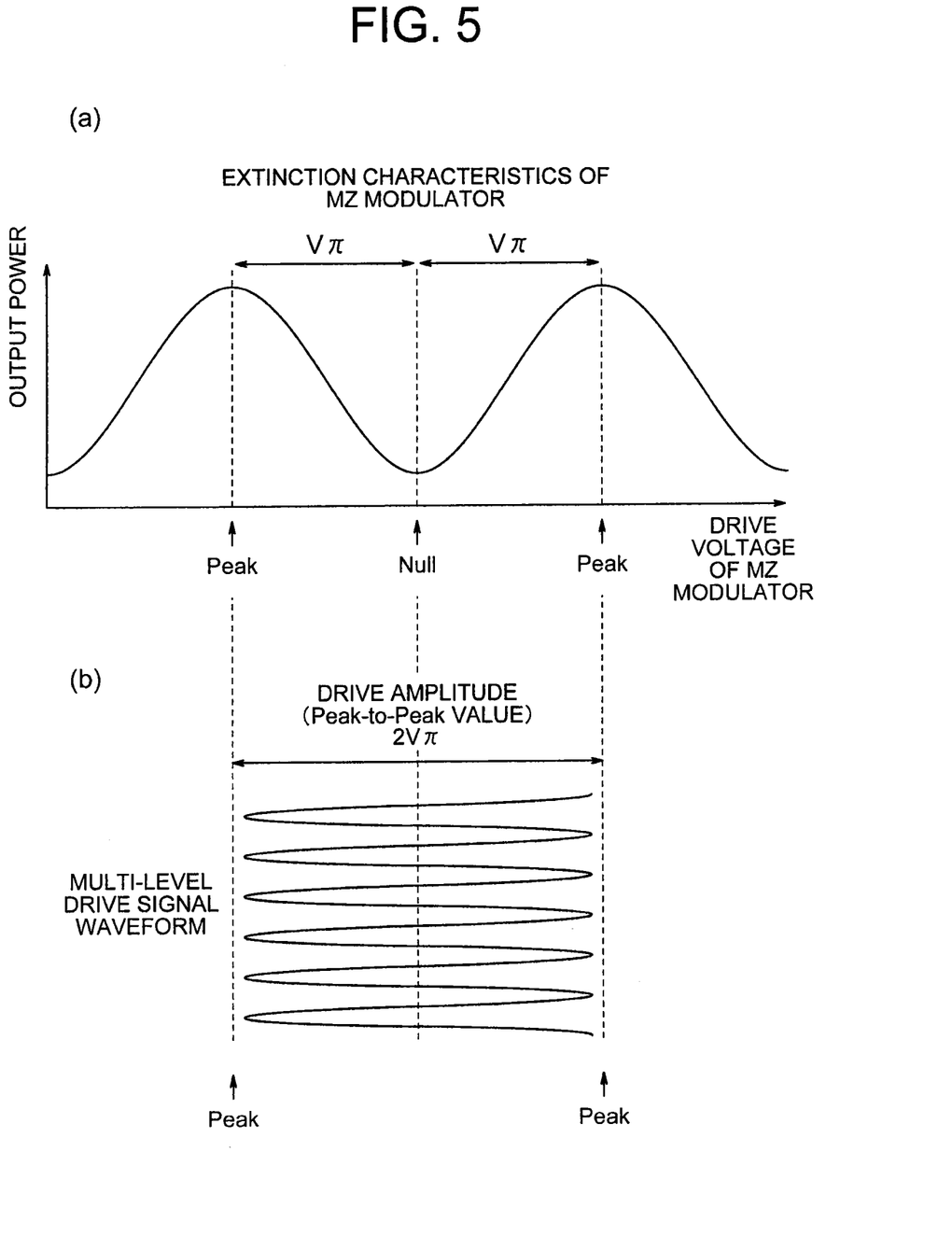
FIG. 5 are graphs showing extinction characteristics of the Mach-Zehnder (MZ) modulator according to the first embodiment of the present invention.

FIG. 5(a) shows extinction characteristics of the MZ modulators 11a and 11b, and FIG. 5(b) shows the waveform of the multi-level drive signal. As shown in FIG. 5(a), in the MZ modulators 11a and 11b, the phase of the optical signal is changed by changing a multi-level drive voltage to be applied. Now, in the multi-level drive voltage to be applied, the point at which the output power of the optical signal becomes minimum is defined as Null point, and the point at which the output power of the optical signal becomes maximum is defined as Peak point.

Further, in FIG. 5(a), a voltage difference between adjacent Null point and Peak point is defined as $V\pi$. In other words, $V\pi$ is the half-wavelength voltage of the MZ modulators 11a and 11b. A binary phase-shift keying (BPSK) signal can be obtained by adjusting the DC bias by the bias control section 10 so as to sweep the signal by $V\pi$ to both sides of the Null point shown in FIG. 5(a). This operation is referred to as "control of the DC bias to the Null point".

FIG. 5(b) shows the waveform of the multi-level drive signal to be output from the electric amplifiers 16a and 16b. FIG. 5(b) shows the case where the drive amplitude (peak-to-peak value) of the multi-level drive signal is set to $2V\pi$. This method of driving the MZ modulators 11a and 11b with multi-level drive signals having the drive amplitude ($2V\pi$) that is twice as large as the half-wavelength voltage ($V\pi$) of the MZ modulators 11a and 11b is referred to as "$2V\pi$ driving". Similarly, the method of driving the MZ modulators 11a and 11b with multi-level drive signals having a drive amplitude ($V\pi$) that is as large as the half-wavelength voltage ($V\pi$) of the MZ modulators 11a and 11b is referred to as "Vπ driving". Note that, the output power of the optical signals of the MZ modulators 11a and 11b becomes maximum in the 2Vπ driving. Thus, in this embodiment, the bias control section 10 sets the amplification factors of the electric amplifiers 16a and 16b so that the peak-to-peak value of the multi-value drive signal may be approximately 2Vπ.

If the non-linearity of the sine-wave extinction characteristics of the MZ modulators 11a and 11b needs to be avoided in the 2Vπ driving, more linear drive voltage to optical electric field characteristics can be obtained by using any one of the following methods (1) to (3).

(1) The drive amplitude is reduced by adjusting the gains of the electric amplifiers 16a and 16b by the bias control section 10.

(2) The amplitude is corrected based on the lookup table of the mapping section 14 (see, for example, Patent Literature 4).

(3) In FIG. 1, a digital signal processing circuit is inserted upstream of the D/A converters 15a and 15b to correct a non-linear response after the outputs of the D/A converters 15a and 15b.

Figure 2:
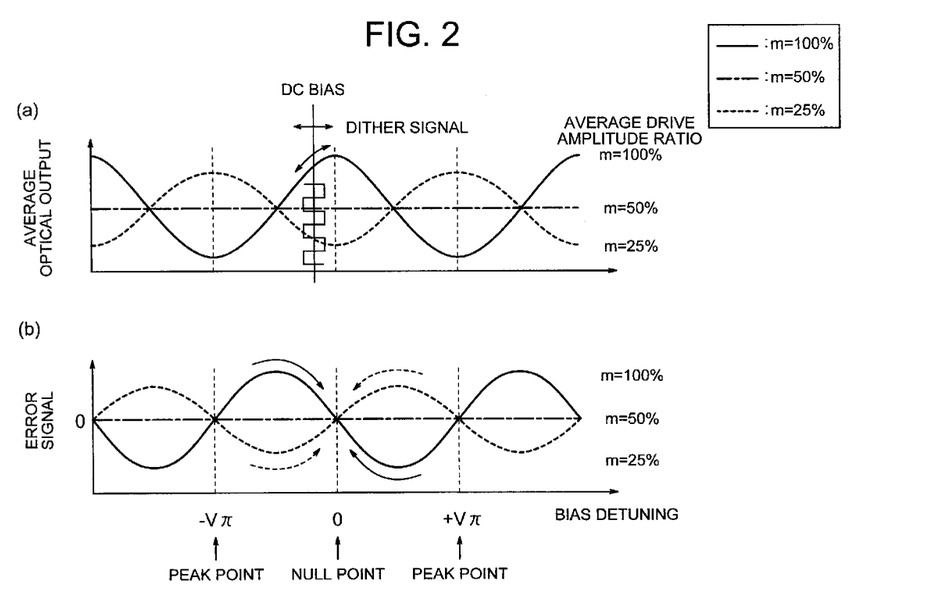
FIG. 2 are graphs showing DC bias control polarity of a Mach-Zehnder (MZ) modulator according to the first embodiment of the present invention.

FIG. 2 show a method of controlling the DC biases of the MZ modulators 11a and 11b with use of an arbitrary analog waveform by the bias control section 10 based on Non Patent Literature 3. FIG. 2(a) shows average optical outputs with respect to the drive amplitudes of the respective MZ modulators 11a and 11b, and FIG. 2(b) shows error signals when a low speed dither signal is superimposed at each DC bias set point. The error signal of FIG. 2(b) is a value expressed as a difference between average power obtained when the DC bias with respect to the rectangular low speed dither signal shown in FIG. 2(a) is biased to the positive side of the DC bias center and average power obtained when the DC bias is biased to the negative side. The error signal of FIG. 2(b) becomes 0 at the maximum value or the minimum value of the sine-wave average optical output curve of FIG. 2(a). FIG. 2 show the characteristics when the drive amplitudes of the MZ modulators 11a and 11b are set so that an average drive amplitude ratio m is 100%, 50%, and 25%. The average drive amplitude ratio m is the ratio of the peak-to-peak value of the multi-level drive signal to 2Vπ when the multi-level drive signal is an ideal rectangular wave (that is, the waveform in which the rise time and fall time of the multi-level drive signal are zero). Thus, when the peak-to-peak value of the multi-level drive signal is set to 2Vπ, m is 100%. Similarly, when the peak-to-peak value is set to Vπ, m is 50%. Also, when the peak-to-peak value is set to ½Vπ, m is 25%. It is understood from the results of FIG. 2 that, when the point at which the error signal becomes zero is set to a convergence point of control, the inclination of the curve of the bias detuning to error signal is inverted at the timing at which the average drive amplitude ratio m is 50%, and the direction of the bias control needs to be inverted depending on the drive amplitude.

Now, a description is given concerning bias control operation to be performed by the optical transmitter (adaptive optical transmitter) according to this embodiment, which adaptively changes the modulation multi-level degree. As shown in FIG. 2, the bias control of the MZ modulators 11a and 11b needs to be performed by inverting the bias control polarity at the timing at which the average drive amplitude ratio m becomes 50%. This is equivalent to the operation of inverting the bias control polarity at the timing at which the loss caused by modulation becomes 3 dB. In the following, a bias control method for the case where the modulation multi-level degree is changed is described.

FIG. 3 is a graph showing an example of the relationship of modulation loss to the modulation multi-level degree. It is supposed that linearization processing is performed by digital signal processing on the transmission side so that signal points in QAM modulation may be arranged at the same intervals on the constellation in the optical electric field. In the case of the configuration showing the characteristics of FIG. 3, when the multi-level degree of modulation is 4 (QPSK), the modulation loss is less than 3 dB, but when the multi-level degree is 16 (16QAM), the modulation loss exceeds 3 dB. Thus, in the example of FIG. 3, the bias control polarity (control direction) needs to be inverted around the point at which the modulation loss exceeds 3 dB. Therefore, in the optical transmitter according to this embodiment, the modulation multi-level degree information is used for discrimination of the bias control polarity, and when the multi-level degree is switched between 4-ary and 16-ary, the bias control polarity is inverted in accordance with the flow of FIG. 4. Consequently, the stable bias control operation can be realized for any modulation multi-level degree.

Figure 4:
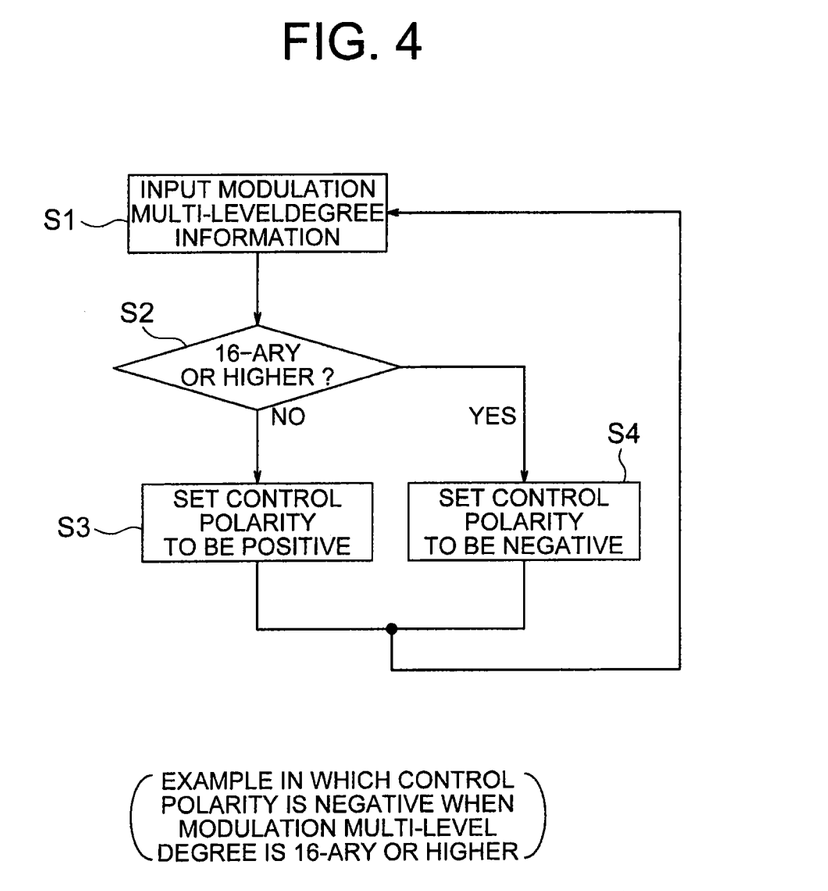
FIG. 4 is a diagram illustrating a method of selecting the DC bias control polarity in the optical modulator according to the first embodiment of the present invention.

Referring to FIG. 4, first, in Step S1, modulation multi-level degree information is input to the bias control section 10. Next, in Step S2, the bias control section 10 determines whether or not the modulation multi-level degree information is 16-ary or higher. When the bias control section 10 determines that the modulation multi-level degree information is lower than 16-ary, the flow proceeds to Step S3. On the other hand, when the bias control section 10 determines that the modulation multi-level degree information is 16-ary or higher, the flow proceeds to Step S4. In Step S3, the bias control section 10 sets the bias control polarity (direction of controlling the I-ch control voltage and the Q-ch control voltage) of the MZ modulators 11a and 11b to be positive. In Step S4, on the other hand, the bias control section 10 sets the bias control polarity (direction of controlling the I-ch control voltage and the Q-ch control voltage) to be negative. After the processing of Step S3 or S4 is finished, the flow returns to Step S1.

In this manner, in this embodiment, the bias control section 10 sets the threshold for the modulation multi-level degree information in advance to perform threshold determination on the modulation multi-level degree information, and inverts the control polarity of the DC bias (I-ch control voltage and Q-ch control voltage) of the MZ modulators 11a and 11b based on the result of the determination. Note that, the threshold is set to 16-ary in the above-mentioned example, but may be appropriately set without being limited thereto.

Further, in the example of FIG. 3, a description has been given of the example of switching the setting of the control polarity for four kinds of multi-level degree, 4-ary, 16-ary, 36-ary, and 64-ary. However, the present invention is not limited thereto, and the number of the kinds of multi-level degree may be any number of two or more.

Note that, a plurality of multi-level degrees can be supported also by controlling the gain of the electric amplifier section and the setting data of the D/A converter so that, for example, the modulation loss may be 3 dB or higher for any modulation multi-level degree without changing the bias control polarity. In this case, however, when the multi-level degree is low, the signal-to-noise ratio of an electric signal excessively deteriorates, and hence there is a problem in that the optical signal quality deteriorates. Thus, by applying this embodiment, the stable bias control can be provided while the signal-to-noise ratio of an electric signal can be maintained to be maximum for each modulation multi-level degree, and hence the stable optical transmitter in which high optical signal quality is maintained can be realized.

In addition, based on the characteristics of FIG. 2(b), when the average drive amplitude ratio m is around 50% (corresponding to the modulation loss of 3 dB), the error signal level is zero or a value very close to zero, and hence the control accuracy may become insufficient. Thus, in this embodiment, the bias control section 10 adjusts the gain setting of the electric amplifier section 16 to control the amplification factor of the electric amplifier section 16 in accordance with the modulation multi-level degree information, to thereby perform control so that both the bias control accuracy and the optical signal quality can be secured in a state in which the modulation loss is apart from 3 dB. With this, a more suitable optical transmitter can be obtained. In this manner, in this embodiment, the amplification factor of the electric amplifier section 16 is set based on the modulation multi-level degree information. Consequently, the optimum amplitude setting of multi-level drive signals depending on the multi-level degree of modulation can be performed.

Besides, when the multi-level degree is changed, required performance and the like of an electric component changes, and hence the optimum operation as an adaptive optical transmitter cannot always be obtained through the correction using a single parameter by the mapping section 14 and the correction using the setting of a single parameter by a digital signal processing circuit (not shown) provided upstream of the D/A converters. In this case, by controlling the correction parameter setting of the mapping section 14, the parameter setting of the digital signal processing circuit (not shown) provided upstream of the D/A converters, and the setting of the electric amplifier section 16 in cooperation with one another based on the modulation multi-level degree information, the optimum operation for a plurality of modulation multi-level degrees can be performed as an optical modulation signal.

As described above, the optical transmitter according to the first embodiment of the present invention for modulating light from the light source to generate an optical transmission signal with use of a data sequence as an electric signal includes: the mapping section 14 for mapping the data sequence to be converted into multi-level data based on the modulation multi-level degree information indicating the multi-level degree of modulation; the D/A converters 15a and 15b each for converting the multi-level data output from the mapping section 14 into an analog signal; the nested MZ modulator 12 to be driven based on the analog signals output from the D/A converters 15a and 15b, for modulating the light from the light source 1; and the bias control section 10 for setting the control polarity of the DC bias control of the nested MZ modulator 12 based on the modulation multi-level degree information. Further, in the first embodiment of the present invention, the optical transmitter further includes the electric amplifier section 16, which is provided between the D/A converters 15a and 15b and the nested MZ modulator 12, for amplifying the analog signals output from the D/A converters 15a and 15b and outputting the amplified analog signals to the nested MZ modulator 12 as the drive signals. The amplification factor of the electric amplifier section 16 is set so that the amplitude of the drive signal of the nested MZ modulator 12 may be approximately twice as large as the half-wavelength voltage of the nested MZ modulator 12.

Consequently, according to the first embodiment of the present invention, by varying the bias control polarity based on the modulation multi-level degree information and by setting the amplitude of the drive signals of the MZ modulators 11a and 11b based on the modulation multi-level degree information, an adaptive optical transmitter superior in optical signal quality and DC bias stability for optical signals having a plurality of modulation multi-level degree can be realized.

REFERENCE NUMERALS LIST 1 light source, 10 bias control section, 11a, 11b Mach-Zehnder modulator (MZ modulator), 12 nested Mach-Zehnder modulator (nested MZ modulator), 13 output power monitoring section, 14 mapping section, 15a, 15b D/A converter, 16 electric amplifier, 16a, 16b electric amplifier, 17 optical branch section, 18 optical multiplexer section

The invention claimed is:

1. An optical transmitter for modulating light from a light source to generate an optical transmission signal with use of a data sequence as an electric signal, the optical transmitter comprising:
    a mapper that includes a processor programmed with a look-up table having multi-level degree information and corresponding modulation loss and that maps the data sequence to be converted into multi-level data based on the modulation multi-level degree information indicating multi-level degree of the modulation, wherein the multi-level degree is adaptively changed;
    a D/A converter that converts the multi-level data output from the mapper into an analog signal;
    an optical modulator, to be driven based on the analog signal output from the D/A converter, that modulates the light from the light source; and
    a bias controller that includes a processor and that sets control polarity of DC bias control of the optical modulator based on the modulation loss determined from the modulation multi-level degree information, wherein
    the bias controller sets the control polarity of the DC bias control of the optical modulator to be positive, when the modulation loss is determined from the multi-level degree information to be less than a threshold, and
    the bias controller sets the control polarity of the DC bias control of the optical modulator to be negative, when the modulation loss is determined from the multi-level degree information to be equal to or larger than the threshold.

2. The optical transmitter according to claim 1, further comprising an electric amplifier, provided between the D/A converter and the optical modulator, that amplifies the analog signal output from the D/A converter and that outputs the amplified analog signal to the optical modulator as a drive signal,
    wherein the electric amplifier includes an amplification factor set based on the modulation multi-level degree information.

3. The optical transmitter according to claim 1, further comprising an electric amplifier, provided between the D/A converter and the optical modulator, that amplifies the analog signal output from the D/A converter and that outputs the amplified analog signal to the optical modulator as a drive signal,
    wherein the electric amplifier includes an amplification factor set so that an amplitude of the drive signal of the optical modulator is approximately twice as large as a half-wavelength voltage of the optical modulator.

4. The optical transmitter according to claim 1, wherein the optical modulator comprises two Mach-Zehnder modulators connected in parallel.

5. A DC bias control method for setting control polarity of DC bias control in an optical modulator to be provided in an optical transmitter, the optical modulator being configured to modulate light from a light source with use of a data sequence as an electric signal, the DC bias control method comprising:

mapping, with a mapper that includes a processor programmed with a look-up table having multi-level degree information and corresponding modulation loss, a data sequence to be converted into multi-level data based on the modulation multi-level degree information indicating multi-level degree of the modulation, wherein the multi-level degree is adaptively changed;

determining, by a DC bias control circuit that includes a processor and based on the modulation multi-level degree information, whether a modulation loss is equal to or larger than a threshold set in advance;

setting, by the DC bias control circuit, the control polarity of the DC bias control of the optical modulator to be positive, when the modulation loss is determined from the multi-level degree information to be less than a threshold; and setting, by the DC bias control circuit, the control polarity of the DC bias control of the optical modulator to be negative, when the modulation loss is determined from the multi-level degree information to be equal to or larger than the threshold.

6. The optical transmitter according to claim 1, wherein the predetermined threshold is 3dB.

\* \* \* \* \*